United States Patent
Zhang et al.

(10) Patent No.: US 10,721,584 B2
(45) Date of Patent: Jul. 21, 2020

(54) METHOD AND NETWORK DEVICE FOR GEO-BASED TRANSMISSION

(71) Applicant: Telefonaktiebolaget LM Ericsson (publ), Stockholm (SE)

(72) Inventors: Zhang Zhang, Beijing (CN); Stefano Sorrentino, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 15 days.

(21) Appl. No.: 16/072,654

(22) PCT Filed: Sep. 29, 2017

(86) PCT No.: PCT/CN2017/104390
§ 371 (c)(1),
(2) Date: Jul. 25, 2018

(87) PCT Pub. No.: WO2019/061296
PCT Pub. Date: Apr. 4, 2019

(65) Prior Publication Data
US 2019/0364382 A1    Nov. 28, 2019

(51) Int. Cl.
*H04W 4/021* (2018.01)
*H04W 4/46* (2018.01)
(Continued)

(52) U.S. Cl.
CPC ............ *H04W 4/021* (2013.01); *H04W 4/06* (2013.01); *H04W 4/44* (2018.02); *H04W 4/46* (2018.02);
(Continued)

(58) Field of Classification Search
CPC ........ H04W 4/021; H04W 4/46; H04W 16/28
See application file for complete search history.

(56) References Cited

U.S. PATENT DOCUMENTS

| 9,596,053 | B1* | 3/2017 | Marupaduga ......... H04L 1/0015 |
| 2014/0244695 | A1 | 8/2014 | Battcher et al. |

(Continued)

FOREIGN PATENT DOCUMENTS

| CN | 104008129 A | 8/2014 |
| CN | 106936887 A | 7/2017 |
| CN | 107145274 A | 9/2017 |
| EP | 3 373 612 A1 | 9/2018 |
| WO | WO 2017/076037 A1 | 5/2017 |
| WO | WO 2017/167012 A1 | 10/2017 |

OTHER PUBLICATIONS

Communication regarding the Extended European Search Report for European Patent Application No. 17923988.4 dated May 29, 2019.
(Continued)

*Primary Examiner* — Hassan Kizou
*Assistant Examiner* — Deepa Belur
(74) *Attorney, Agent, or Firm* — Sage Patent Group (57) ABSTRACT

The present disclosure provides a method in a network device for geo-based transmission. The network device comprises at least one Transmission/Reception Point (TRP) each configured with at least one beam. The method comprises: obtaining a target geographical area of a data packet; selecting, from the at least one TRP and/or the at least one beam, one or more TRPs and/or beams for broadcasting the data packet based on the target geographical area; and broadcasting the data packet via the selected one or more TRPs and/or beams.

12 Claims, 6 Drawing Sheets

(51) Int. Cl.
  *H04W 4/44* (2018.01)
  *H04W 4/06* (2009.01)
  *H04W 16/28* (2009.01)
  *H04W 72/04* (2009.01)
  *H04W 4/70* (2018.01)

(52) U.S. Cl.
  CPC ......... *H04W 16/28* (2013.01); *H04W 72/046* (2013.01); *H04W 4/70* (2018.02)

(56) References Cited

U.S. PATENT DOCUMENTS

| | | | | |
|---|---|---|---|---|
| 2015/0382334 | A1* | 12/2015 | El Ayach | H04W 16/28 370/336 |
| 2016/0047884 | A1* | 2/2016 | Zhang | H04B 7/0617 342/458 |
| 2016/0309305 | A1* | 10/2016 | Wilhelmsson | H04B 7/0408 |
| 2017/0222880 | A1* | 8/2017 | Callard | H04L 41/12 |
| 2017/0346545 | A1* | 11/2017 | Islam | H01Q 1/245 |
| 2019/0104386 | A1* | 4/2019 | Kim | H04W 4/00 |
| 2019/0268879 | A1* | 8/2019 | Lee | H04W 72/085 |
| 2019/0319686 | A1* | 10/2019 | Chen, IV | H04W 72/046 |

OTHER PUBLICATIONS

ZTE, "Localized Uu based V2X architecture concerning on eMBMS," 3GPP TSG-RAN WG3 #91, St.Julian's, Malta, Feb. 15-19, 2016, R3-160206, 5 pages.

ZTE, "Discussion on the eMBMS based V2X broadcast," 3GPP TSG-RAN WG2 #93, St.Julian's, Malta, Feb. 15-19, 2016, R2-161430, 5 pages.

3GPP TS 22.185 V14.2.1 "3rd Generation Partnership Project; Technical Specification Group Services and System Aspects; Service requirements for V2X services; Stage 1 (Release 14)," Nov. 2016, 14 pages.

3GPP TS 36.300 V14.0.0 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," Sep. 2016, 314 pages.

3GPP TR 38.913 V14.1.0 "3rd Generation Partnership Project; Technical Specification Group Radio Access Network; Study on Scenarios and Requirements for Next Generation Access Technologies; (Release 14)," Dec. 2016, 38 pages.

RP-162255, 3GPP TSG-RAN Meeting #74, Vienna Austria, Dec. 5-8, 2016—Presentation of Report to TSG of 3GPP TR 38.801 V1.0.0 "3rd Generation Partnership Project; Technical Specification Group Radio Access Network; Study on New Radio Access Technology; Radio Access Architecture and Interfaces (Release 14)," Dec. 2016, 73 pages.

RP-160790, 3GPP TSG-RAN Meeting #72, Busan, Korea, Jun. 13-16, 2016—Presentation of Report of 3GPP TR 36.885 V2.0.0 "3rd Generation Partnership Project; Technical Specification Group Radio Access Network; Study on LTE-based V2X Services; (Release 14)," Jun. 2016, 221 pages.

Notification of Transmittal of the International Search Report and the Written Opinion of the International Searching Authority, or the Declaration for International Application No. PCT/CN2017/104390 dated Jun. 13, 2018.

* cited by examiner

METHOD AND NETWORK DEVICE FOR GEO-BASED TRANSMISSION

CROSS REFERENCE TO RELATED APPLICATION

This application is a 35 U.S.C. § 371 national stage application of PCT International Application No. PCT/CN2017/104390, filed on Sep. 29, 2017, the disclosure and content of which is incorporated by reference herein in its entirety.

TECHNICAL FIELD

The present disclosure relates to wireless communications, and more particularly, to a method and a network device for geo-based transmission.

BACKGROUND

In the 3$^{rd}$ Generation Partnership Project (3GPP) Release 14, Device-to-Device (D2D) communications have been extended to support Vehicle-to-Everything (V2x) communications, including any combination of direct communications among vehicles, pedestrians and network infrastructures. In 3GPP Technical Specification (TS) 22.185, V14.2.1, several different use cases for V2x have been investigated:
- Vehicle-to-Vehicle (V2V), covering Long Term Evolution (LTE)-based communication between vehicles;
- Vehicle-to-Pedestrian (V2P): covering LTE-based communication between a vehicle and a device carried by an individual (e.g. handheld terminal carried by a pedestrian, cyclist, driver or passenger); and
- Vehicle-to-Infrastructure/Network (V2I/N): covering LTE-based communication between a vehicle and a roadside unit/network (a roadside unit (RSU) is a stationary infrastructure entity supporting V2x applications that can exchange messages with other entities supporting V2x applications).

Downlink messages, originated from either vehicle User Equipment (UE) in V2V communications or from a network in V2N communications, are generally intended for a group of UEs within a particular geographical area. Unicast cannot provide sufficient capacity when there is a high traffic load, and broadcast/multicast is naturally an option for efficient delivery of such messages. In LTE, Multimedia Broadcast/Multicast Service (MBMS) has been introduced to provide an efficient mode of delivery for broadcast and multicast services. MBMS transmissions can be provided in a Multicast/Broadcast Single-Frequency Network (MBSFN), where the content of an MBMS bearer (which corresponds to a specific service identified by a Temporary Mobile Group Identity (TMGI)) is transmitted from different cells belonging to one single MBMS area, which can be a very large area. MBSFN transmissions occur over a dedicated multicast transport channel (MCH) over which control signaling (on Multicast Control Channel (MCCH)) and data (on Multicast Traffic Channel (MTCH)) can be multiplexed.

Single Cell Point-To-Multipoint (SC-PTM) has been introduced in 3GPP Release13, where multicasting/broadcasting of MBMS data is limited to a single cell area, and multicast/broadcast transmissions (for both control signaling and data) are sent over Physical Downlink Shared Channel (PDSCH) and scheduled by an evolved NodeB (eNB).

V2x communications can be a local broadcast in a limited area. For example, a message from a UE close to the center of a cell may be intended for UEs served by the same cell, while a message from a UE close to a border of a cell may be intended for UEs served by multiple cells. In the former case, it may be beneficial to broadcast the message in one single cell or even a smaller area for reducing redundancy. In the latter case, it may be beneficial to broadcast the message in multiple cells to ensure that all relevant UEs can receive the message.

To efficiently handle the different cases as disclosed above, a geographical-location-based (or geo-based) transmission has been introduced for V2x downlink messages using MBMS in 3GPP TS 36.885, V2.0.0. First, a V2x application server requests and (pre-)establishes one or more MBMS bearers (TMGIs) to appropriate eNBs. Each MBMS bearer is associated with a particular geographical area consisting of one or more cells, and is only transmitted in that area. Here the geo-based routing is performed at the V2x application server. An originating vehicle UE sends a V2x message, including its geographical location and possibly information on its serving cell, to the V2x application server. The V2x application server first determines a target MBMS service area of the V2x message based on the geographical location of the originating vehicle UE and possibly the information on the serving cell, and then selects the MBMS bearer(s) to be used for transmission of the V2x message in the target MBMS service area. The V2x message is then transmitted over the selected MBMS bearer(s) in their associated cell(s). All vehicle UEs that are served by the cell(s) and interested in the V2x message can receive the V2x message.

However, the above solution of geo-based transmission cannot support any target area smaller than a cell.

In order to provide a finer granularity, the entire network area can be divided into a number of local areas, which can be smaller than a cell. In an exemplary solution, the definition of each local area, i.e., its corresponding geographical location, can be known to both the V2x application server and the UEs, but not to eNBs. An eNB only knows the identifiers (IDs) of the local areas contained or partially contained in its coverage. Each MBMS bearer can be associated with a local area. In order to broadcast a message in a particular local area, the V2x application server informs an eNB of a TMGI and an associated local area ID. The eNB broadcasts the message in its entire cell along with the TMGI and the associated local area ID. The UEs in the cell can determine whether to receive the message or not based on the local area ID, the definition of the local area and its current geographical location. Again, in this solution the geo-based routing is performed at the V2x application server.

In New Radio (NR), both the V2x and the MBMS will continue to evolve. For the V2x communications in NR, the required medium rate could be up to 10 Mbps per device, which is much higher than the V2x in LTE. For the MBMS, an MBMS service area may be adjusted dynamically based on e.g. user distribution or service requirements (which relate to e.g. the required communication range). The conventional geo-based transmission may be inefficient when applied in NR.

There is thus a need for an improved solution for geo-based transmission.

SUMMARY

It is an object of the present disclosure to provide a method and a network device for geo-based transmission, capable of transmitting broadcast data to a target geographical area in a more efficient manner.

According to a first aspect of the present disclosure, a method in a network device for geo-based transmission is provided. The network device comprises at least one Transmission/Reception Point (TRP) each configured with at least one beam. The method comprises: obtaining a target geographical area of a data packet; selecting, from the at least one TRP and/or the at least one beam, one or more TRPs and/or beams for broadcasting the data packet based on the target geographical area; and broadcasting the data packet via the selected one or more TRPs and/or beams.

In an embodiment, the operation of obtaining comprises: receiving, from a core network node, location information indicating the target geographical area.

In an embodiment, the operation of obtaining comprises: receiving, from a core network node, location information indicating a source geographical location at which a terminal device transmitting the data packet is located; and calculating the target geographical area based at least on the source geographical location.

In an embodiment, the location information is represented by one of: geographical location coordinates, a reference location of a local area, and a local area identifier.

In an embodiment, the location information is received on a per packet basis or a per session basis.

In an embodiment, the network device has a coverage area that is divided into a plurality of geographical area units. The operation of selecting comprises: determining one or more of the plurality of geographical area units to cover the target geographical area; and selecting from the at least one TRP and/or the at least one beam the one or more TRPs and/or beams associated with the one or more geographical area units.

In an embodiment, the data packet is a Multimedia Broadcast/Multicast Service (MBMS) packet transmitted over an MBMS bearer that is mapped to one or more MBMS Radio Bearers (RBs) each corresponding to one of the selected one or more TRPs and/or beams.

In an embodiment, the MBMS packet is associated with Vehicle-to-Everything (V2x) communication.

According to a second aspect of the present disclosure, a network device is provided. The network device comprises a transceiver, a processor and a memory. The memory comprises instructions executable by the processor whereby the network device is operative to perform the method according to the above first aspect.

According to a third aspect of the present disclosure, a network device for geo-based transmission is provided. The network device comprises at least one TRP each configured with at least one beam. The network device further comprises: an obtaining unit configured to obtain a target geographical area of a data packet; a selecting unit configured to select, from the at least one TRP and/or the at least one beam, one or more TRPs and/or beams for broadcasting the data packet based on the target geographical area; and a broadcasting unit configured to broadcast the data packet via the selected one or more TRPs and/or beams.

The above embodiments of the first aspect also apply to the third aspect.

According to a fourth aspect of the present disclosure, a communication system is provided. The communication system comprises: an application server; a core network node; the network device according to the above second or third aspect; a transmitting terminal device; and one or more receiving terminal devices. The application server is configured to receive a data packet from the transmitting terminal device and forward the data packet, along with location information indicating a target geographical area of the data packet or a source geographical location at which the transmitting terminal device is located, to the core network node. The core network node is configured to forward the data packet and the location information to the network device. The network device is configured to broadcast the data packet based on the location information. Each of the one or more receiving terminal devices is configured to receive the data packet from the network device.

In an embodiment, for each of the one or more receiving terminal devices, the receiving terminal device receives the data packet from a number of TRPs and/or beams having the highest signal strength or quality, and/or from a number of TRPs or beams each having a signal strength or quality higher than a threshold. According to a fifth aspect of the present disclosure, a communication system is provided. The communication system includes a host computer comprising processing circuitry configured to provide user data; and a communication interface configured to forward the user data to a cellular network for transmission to a UE. The cellular network comprises a base station having a radio interface and processing circuitry. The base station's processing circuitry configured to perform the method according to the above first aspect.

In an embodiment, the communication system further includes the base station.

In an embodiment, the communication system further includes the UE. The UE is configured to communicate with the base station.

In an embodiment, the processing circuitry of the host computer is configured to execute a host application, thereby providing the user data. The UE comprises processing circuitry configured to execute a client application associated with the host application.

According to a sixth aspect of the present disclosure, a method implemented in a communication system is provided. The communication system includes a host computer, a base station and a UE. The method comprises: at the host computer, providing user data; and at the host computer, initiating a transmission carrying the user data to the UE via a cellular network comprising the base station. The base station performs the method according to the above first aspect.

In an embodiment, the method further comprises: at the base station, transmitting the user data.

In an embodiment, the user data is provided at the host computer by executing a host application. The method further comprises: at the UE, executing a client application associated with the host application.

With the embodiments of the present disclosure, a network device having at least one TRP, each configured with at least one beam, can select one or more TRPs and/or beams for broadcasting a data packet based on a target geographical area. In this way, it is possible to transmit the broadcast data to the target geographical area in a more efficient manner.

BRIEF DESCRIPTION OF THE DRAWINGS

The above and other objects, features and advantages will be more apparent from the following description of embodiments with reference to the figures, in which.

DETAILED DESCRIPTION

The embodiments of the disclosure will be detailed below with reference to the drawings. It should be appreciated that the following embodiments are illustrative only, rather than limiting the scope of the disclosure.

As used herein, the term "network device" refers to a device in a wireless communication network via which a terminal device accesses the network and receives services therefrom. The network device refers to a base station (BS), an access point (AP), or any other suitable device in the wireless communication network. The BS may be, for example, a node B (NodeB or NB), an evolved NodeB (eNodeB or eNB), or gNB, a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, image capture terminal devices such as digital cameras, gaming terminal devices, music storage and playback appliances, a mobile phone, a cellular phone, a smart phone, voice over IP (VoIP) phones, wireless local loop phones, a tablet, a wearable device, a personal digital assistant (PDA), portable computers, desktop computer, image capture terminal devices such as digital cameras, gaming terminal devices, music storage and playback appliances, wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

In order to provide higher capacities for V2x communications, a straightforward way is to allow higher spatial resolution, i.e., transmitting data messages in a smaller target area.

Figure 1:
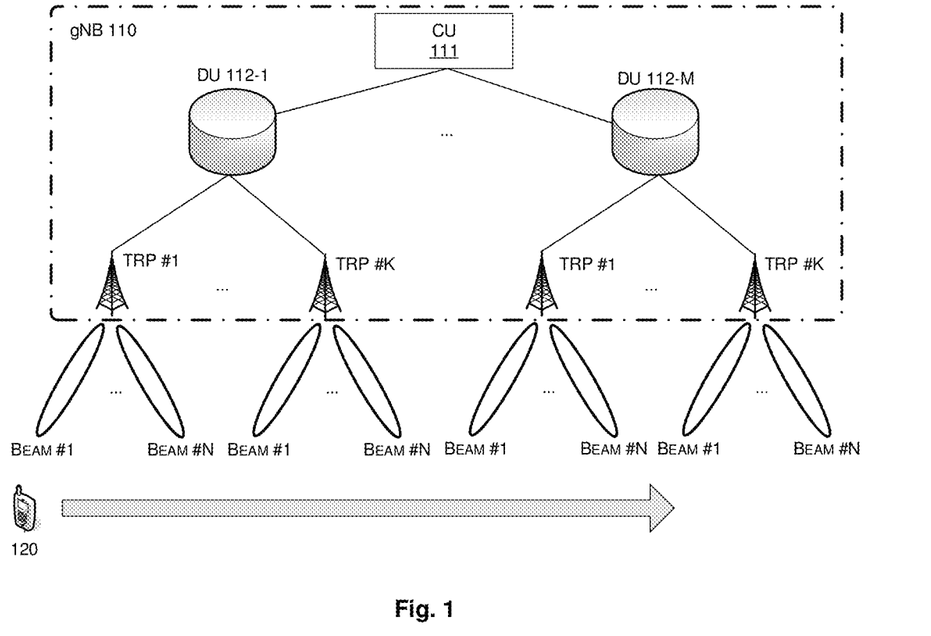
FIG. 1 is a schematic diagram showing an exemplary structure of a network device in NR.

FIG. 1 is a schematic diagram showing an exemplary structure of a network device 110, which can be a gNB in NR. As shown, the network device 110 includes a Central Unit (CU) 111 connected with one or more Distributed Units (DUs) 112-1~112-M. Each DU 112-1~112-M may have one or more Transmission/Reception Points (TRPs) #1~# K, and each TRP may have one or more beams #1~# N. In the structure shown in FIG. 1, each TRP and/or beam may only serve a fairly small area. 3GPP Technical Report 38.801 V1.0.0 discusses various options for functional splits between the CU and the DU(s). In these options, only the CU, or the CU and the DU(s), is visible to a Core Network (CN), while the TRP(s) and beam(s) are only visible in a Radio Access Network (RAN) but not to the CN. Accordingly, if a terminal device 120 moves in the direction shown by the arrow in FIG. 1, it will experience changes in its serving beam(s), serving TRP(s) or serving DU. The CN will not be aware of such changes of serving TRP(s) and/or serving beam(s) and thus the V2x application server, which is connected to the CN, will not be able to carry out geo-based transmission at the TRP and/or beam level.

The inventors have realized that it would be beneficial if the gNB can take over at least part of geo-based transmission of a V2x message, as the coverage of each TRP or beam is only known to the gNB, but not to the V2x application server which is conventionally responsible for the geo-based routing. Moreover, since the configuration and coverage of each TRP and/or beam may vary dynamically over time, it would be difficult for the V2x application server to maintain a correspondence between geographical information stored at the V2x application server and the actual coverage of each TRP and/or beam.

It is to be noted here that, while some embodiments of the present disclosure are described in the context of V2x communications and MBMS transmission/reception, the present disclosure is not limited thereto. Rather, the embodiments of the present disclosure can be applied to any data transmission that is destined to a particular geographical area.

Figure 2:
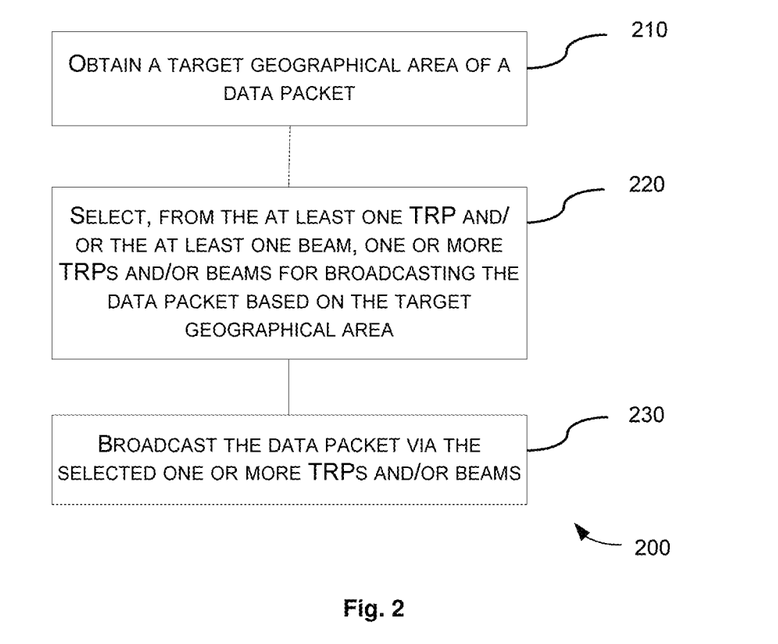
FIG. 2 is a flowchart illustrating a method for geo-based transmission according to an embodiment of the present disclosure.

FIG. 2 is a flowchart illustrating a method 200 for geo-based transmission according to an embodiment of the present disclosure. The method 200 can be performed at a network device. The network device can include at least one Transmission/Reception Point (TRP), each configured with at least one beam.

At block 210, a target geographical area of a data packet is obtained. Here, the data packet can be an MBMS packet transmitted over an MBMS bearer. As a non-limiting example, the MBMS packet may be associated with V2x communication.

In an example, at the block 210, location information indicating the target geographical area can be received from a core network node (e.g., an evolved Broadcast/Multicast-Service Center, or eBM-SC).

Alternatively, at the block 210, location information indicating a source geographical location at which a terminal device transmitting the data packet is located can be received from a core network node (e.g., eBM-SC). The target geographical area can be calculated based at least on the source geographical location. For example, the target geographical area may be calculated based further on a transmission range centered at the source geographical location, dependent on e.g., a service type associated with the data packet.

In an example, the above location information, i.e., the location information indicating the target geographical area and/or the location information indicating the source geographical location, can be represented by geographical location coordinates, i.e., absolute geographical location.

Alternatively, the location information can be represented by a reference location of a local area. In this case, the entire network area can be divided into a number of local areas each having a reference location. An application server (e.g., a V2x application server) can map the target geographical area or the source geographical location to a reference location of a local area and only inform the network device of the reference location, and optionally the shape and/or size of the local area, via the core network node (e.g., eBM-SC). As another alternative, the location information can be represented by a local area identifier (ID). The mapping between local areas and local area IDs can be known to the network device in advance.

In an example, the above location information, i.e., the location information indicating the target geographical area and/or the location information indicating the source geographical location, can be received on a per packet basis or a per session basis, e.g., from the core network node (e.g., eBM-SC). For example, the location information can be added to an MBMS packet containing a V2x message in a transport network layer. Alternatively, the location information can be added as a part of MBMS session information when an MBMS session is started by the core network node (e.g., eBM-SC). For example, MBMS packets with the same location information can be transmitted in the same MBMS session. MBMS sessions with different location information can be transmitted over the same MBMS bearer and have the same TMGI, and can be transmitted in the same network device(s) or cell(s).

At block 220, from the at least one TRP and/or the at least one beam, one or more TRPs and/or beams for broadcasting the data packet are selected based on the target geographical area, such that the selected one or more TRPs and/or beams can cover the target geographical area.

In an example, the network device has a coverage area that is divided into a plurality of geographical area units. Each geographical area unit can be associated with one or more TRPs and/or one or more beams. At the block 220, one or more of the plurality of geographical area units can be determined to cover the target geographical area. The one or more TRPs and/or beams associated with the one or more geographical area units can be selected from the at least one TRP and/or the at least one beam.

In the example where a data packet is an MBMS packet transmitted over an MBMS bearer, the MBMS bearer can be mapped to one or more MBMS Radio Bearers (RBs) each corresponding to one of the selected one or more TRPs and/or beams. In this case, the scheduling information for the MBMS RBs, including e.g., Reference Signal (RS), resource allocation, and Modulation and Coding Scheme (MCS), can be transmitted by the network device using e.g. a group Radio Network Temporary Identifier (RNTI) as in LTE.

At block 230, the data packet is broadcast via the selected one or more TRPs and/or beams. As such, terminal devices in the target geographical area can receive the data packet.

Figure 3:
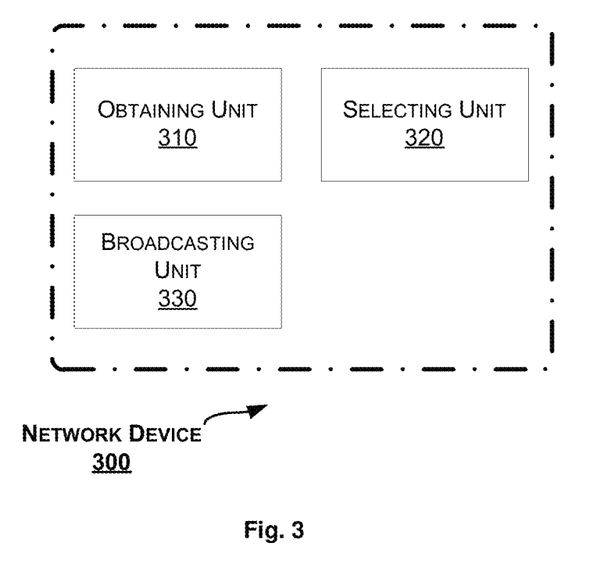
FIG. 3 is a block diagram of a network device according to an embodiment of the present disclosure.

Correspondingly to the method 200 as described above, a network device is provided. FIG. 3 is a block diagram of a network device 300 for geo-based transmission according to an embodiment of the present disclosure. The network device 300 includes at least one TRP each configured with at least one beam.

As shown in FIG. 3, the network device 300 further includes an obtaining unit 310 configured to obtain a target geographical area of a data packet. The network device 300 further includes a selecting unit 320 configured to select, from the at least one TRP and/or the at least one beam, one or more TRPs and/or beams for broadcasting the data packet based on the target geographical area. The network device 300 further includes a broadcasting unit 330 configured to broadcast the data packet via the selected one or more TRPs and/or beams.

In an embodiment, the obtaining unit 310 is configured to receive, from a core network node, location information indicating the target geographical area.

In an embodiment, the obtaining unit 310 is configured to: receive, from a core network node, location information indicating a source geographical location at which a terminal device transmitting the data packet is located; and calculate the target geographical area based at least on the source geographical location.

In an embodiment, the location information is represented by one of: geographical location coordinates, a reference location of a local area, and a local area identifier.

In an embodiment, the location information is received on a per packet basis or a per session basis.

In an embodiment, the network device has a coverage area that is divided into a plurality of geographical area units. The selecting unit 320 is configured to: determine one or more of the plurality of geographical area units to cover the target geographical area; and select from the at least one TRP and/or the at least one beam the one or more TRPs and/or beams associated with the one or more geographical area units.

In an embodiment, the data packet is a Multimedia Broadcast/Multicast Service (MBMS) packet transmitted over an MBMS bearer that is mapped to one or more MBMS Radio Bearers (RBs) each corresponding to one of the selected one or more TRPs and/or beams.

In an embodiment, the MBMS packet is associated with Vehicle-to-Everything (V2x) communication.

The obtaining unit 310, the selecting unit 320 and the broadcasting unit 330 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 2.

Figure 4:
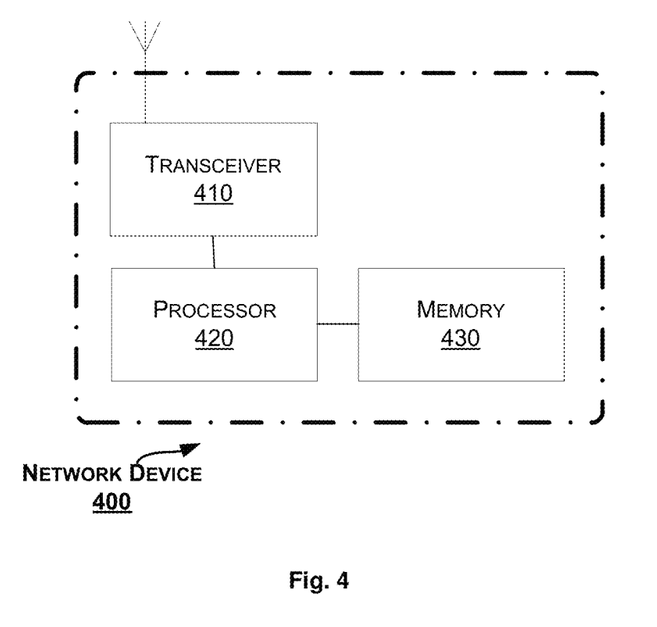
FIG. 4 is a block diagram of a network device according to another embodiment of the present disclosure.

FIG. 4 is a block diagram of a network device 400 according to another embodiment of the present disclosure. The network device 400 can be provided for geo-based transmission. The network device 400 includes at least one TRP each configured with at least one beam.

The network device 400 includes a transceiver 410, a processor 420 and a memory 430. The memory 430 contains instructions executable by the processor 420 whereby the network device 400 is operative to perform the actions, e.g., of the procedure described earlier in conjunction with FIG. 2. Particularly, the memory 430 contains instructions executable by the processor 420 whereby the network device 400 is operative to: obtain a target geographical area of a data packet;

select, from the at least one TRP and/or the at least one beam, one or more TRPs and/or beams for broadcasting the data packet based on the target geographical area; and broadcast the data packet via the selected one or more TRPs and/or beams.

In an embodiment, the operation of obtaining includes: receiving, from a core network node, location information indicating the target geographical area.

In an embodiment, the operation of obtaining includes: receiving, from a core network node, location information indicating a source geographical location at which a terminal device transmitting the data packet is located; and calculating the target geographical area based at least on the source geographical location.

In an embodiment, the location information is represented by one of: geographical location coordinates, a reference location of a local area, and a local area identifier.

In an embodiment, the location information is received on a per packet basis or a per session basis.

In an embodiment, the network device has a coverage area that is divided into a plurality of geographical area units. The operation of selecting includes: determining one or more of the plurality of geographical area units to cover the target geographical area; and selecting from the at least one TRP and/or the at least one beam the one or more TRPs and/or beams associated with the one or more geographical area units.

In an embodiment, the data packet is a Multimedia Broadcast/Multicast Service (MBMS) packet transmitted over an MBMS bearer that is mapped to one or more MBMS Radio Bearers (RBs) each corresponding to one of the selected one or more TRPs and/or beams.

In an embodiment, the MBMS packet is associated with Vehicle-to-Everything (V2x) communication.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 420 causes the network device 400 to perform the actions, e.g., of the procedure described earlier in conjunction with FIG. 2.

The computer program product may be configured as a computer program code structured in computer program modules. The computer program modules could essentially perform the actions of the flow illustrated in FIG. 2.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

Figure 5:
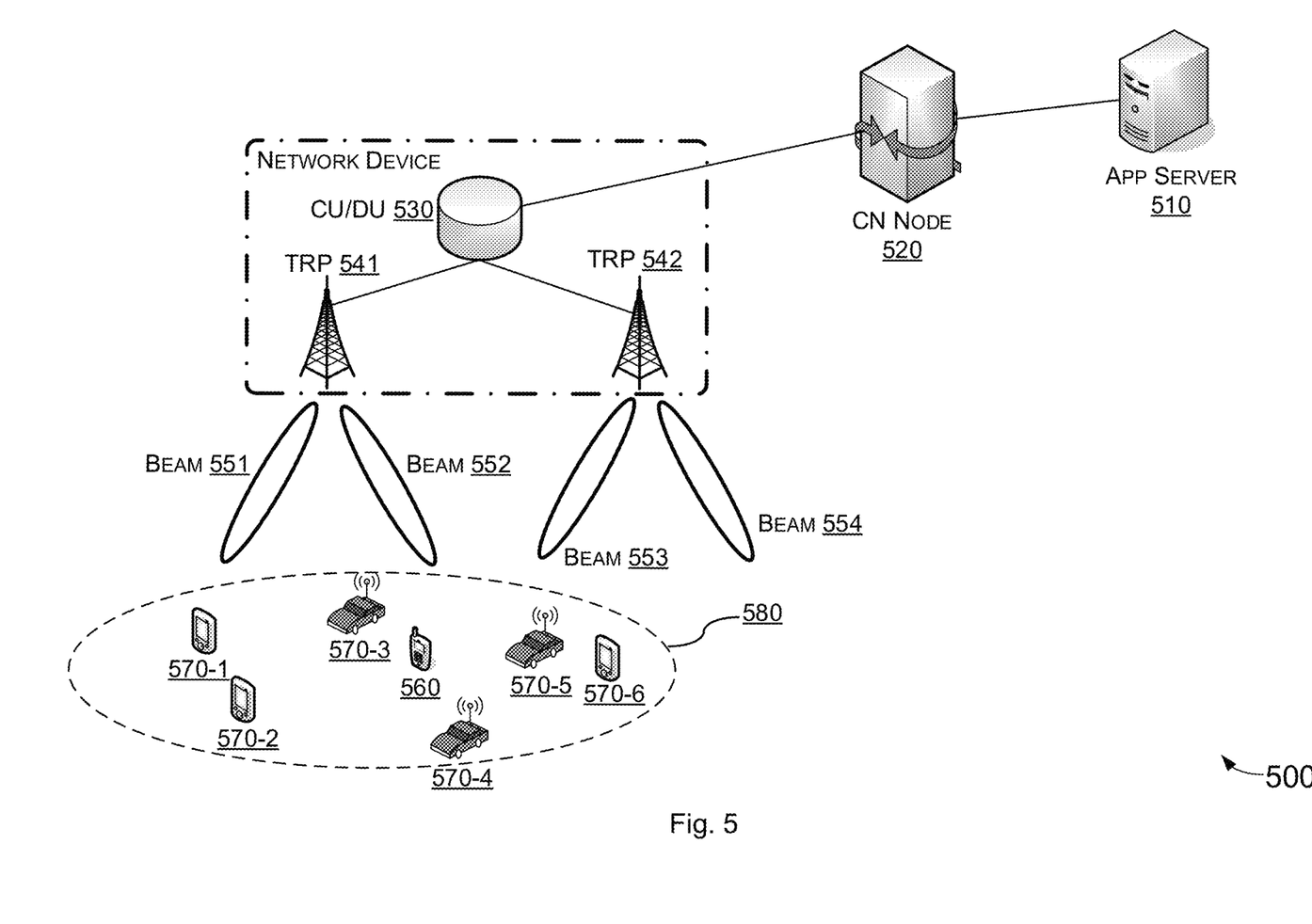
FIG. 5 is a schematic diagram showing a communication system according to an embodiment of the present disclosure.

FIG. 5 is a schematic diagram showing a communication system 500 according to an embodiment of the present disclosure.

The communication system includes: an application server (e.g., a V2x application server) 510; a core network node (e.g., eBM-SC) 520; a network device (e.g., the network device 300 or 400 as described above); a transmitting terminal device 560 (e.g., V2x UE); and one or more receiving terminal devices 570-1~570-6 (referred to as 570 collectively). The network device includes a CU/DU 530 and at least one TRP each configured with at least one beam. As an example, two TRPs 541 and 542 are shown in FIG. 5. The TRP 541 has beams 551 and 552 and the TRP 542 has beams 553 and 554.

The application server 510 is configured to receive a data packet from the transmitting terminal device 560 and forward the data packet, along with location information indicating a target geographical area 580 of the data packet or a source geographical location at which the transmitting terminal device 560 is located, to the core network node 520. The core network node 520 is configured to forward the data packet and the location information to the network device. The network device is configured to broadcast the data packet based on the location information. As described above in connection with the method 200, the network device can select one or more TRPs and/or beams for broadcasting the data packet based on the target geographical area 580. For example, the network device can select the TRP 541 and the TRP 542, and/or the beams 551, 552 and 553, for broadcasting the data packet. Each of the one or more receiving terminal devices 570 is configured to receive the data packet from the network device.

In an example, each receiving terminal device 570 can receive the data packet from a number of TRPs or beams having the highest signal strength or quality, and/or from a number of TRPs or beams each having a signal strength or quality higher than a threshold.

It is to be noted here that all the features and aspects described above in connection with the method 200, especially those related to operations at the network device, also apply to the communication system 500.

Figure 6:
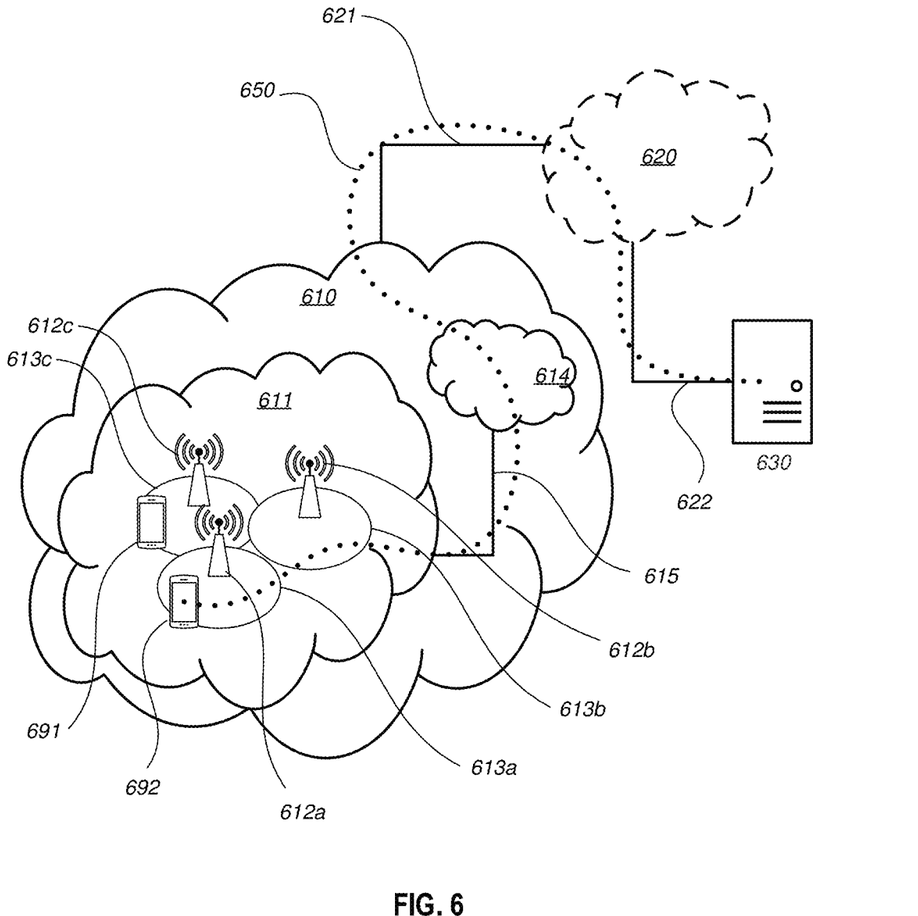
FIG. 6 schematically illustrates a telecommunication network connected via an intermediate network to a host computer.

With reference to FIG. 6, in accordance with an embodiment, a communication system includes a telecommunication network 610, such as a 3GPP-type cellular network, which comprises an access network 611, such as a radio access network, and a core network 614. The access network 611 comprises a plurality of base stations 612a, 612b, 612c, which may be configured to operate according to method 200, such as NBs, eNBs, gNBs or other types of wireless access points, each defining a corresponding coverage area 613a, 613b, 613c. Each base station 612a, 612b, 612c is connectable to the core network 614 over a wired or wireless connection 615. A first user equipment (UE) 691 located in coverage area 613c is configured to wirelessly connect to, or be paged by, the corresponding base station 612c. A second UE 692 in coverage area 613a is wirelessly connectable to the corresponding base station 612a. While a plurality of UEs 691, 692 are illustrated in this example, the disclosed embodiments are equally applicable to a situation where a sole UE is in the coverage area or where a sole UE is connecting to the corresponding base station 612.

The telecommunication network 610 is itself connected to a host computer 630, which may be embodied in the hardware and/or software of a standalone server, a cloud-implemented server, a distributed server or as processing resources in a server farm. The host computer 630 may be under the ownership or control of a service provider, or may be operated by the service provider or on behalf of the service provider. The connections 621, 622 between the telecommunication network 610 and the host computer 630 may extend directly from the core network 614 to the host computer 630 or may go via an optional intermediate network 620. The intermediate network 620 may be one of, or a combination of more than one of, a public, private or hosted network; the intermediate network 620, if any, may be a backbone network or the Internet; in particular, the intermediate network 620 may comprise two or more sub-networks (not shown).

The communication system of FIG. 6 as a whole enables connectivity between one of the connected UEs 691, 692 and the host computer 630. The connectivity may be described as an over-the-top (OTT) connection 650. The host computer 630 and the connected UEs 691, 692 are configured to communicate data and/or signaling via the OTT connection 650, using the access network 611, the core network 614, any intermediate network 620 and possible further infrastructure (not shown) as intermediaries. The OTT connection 650 may be transparent in the sense that the participating communication devices through which the OTT connection 650 passes are unaware of routing of uplink and downlink communications. For example, a base station 612 may not or need not be informed about the past routing of an incoming downlink communication with data originating from a host computer 630 to be forwarded (e.g., handed over) to a connected UE 691. Similarly, the base station 612 need not be aware of the future routing of an outgoing uplink communication originating from the UE 691 towards the host computer 630.

Example implementations, in accordance with an embodiment, of the UE, base station and host computer discussed in the preceding paragraphs will now be described with reference to FIG. 7. In a communication system 700, a host computer 710 comprises hardware 715 including a communication interface 716 configured to set up and maintain a wired or wireless connection with an interface of a different communication device of the communication system 700. The host computer 710 further comprises processing circuitry 718, which may have storage and/or processing capabilities. In particular, the processing circuitry 718 may comprise one or more programmable processors, application-specific integrated circuits, field programmable gate arrays or combinations of these (not shown) adapted to execute instructions. The host computer 710 further comprises software 711, which is stored in or accessible by the host computer 710 and executable by the processing circuitry 718. The software 711 includes a host application 712. The host application 712 may be operable to provide a service to a remote user, such as a UE 730 connecting via an OTT connection 750 terminating at the UE 730 and the host computer 710. In providing the service to the remote user, the host application 712 may provide user data which is transmitted using the OTT connection 750.

The communication system 700 further includes a base station 720 provided in a telecommunication system and comprising hardware 725 enabling it to communicate with the host computer 710 and with the UE 730. The hardware 725 may include a communication interface 726 for setting up and maintaining a wired or wireless connection with an interface of a different communication device of the communication system 700, as well as a radio interface 727 for setting up and maintaining at least a wireless connection 770 with a UE 730 located in a coverage area (not shown in FIG. 7) served by the base station 720. The communication interface 726 may be configured to facilitate a connection 760 to the host computer 710. The connection 760 may be direct or it may pass through a core network (not shown in FIG. 7) of the telecommunication system and/or through one or more intermediate networks outside the telecommunication system. In the embodiment shown, the hardware 725 of the base station 720 further includes processing circuitry 728, which may comprise one or more programmable processors, application-specific integrated circuits, field programmable gate arrays or combinations of these (not shown) adapted to execute instructions. The base station 720 further has software 721 stored internally or accessible via an external connection.

The communication system 700 further includes the UE 730 already referred to. Its hardware 735 may include a radio interface 737 configured to set up and maintain a wireless connection 770 with a base station serving a coverage area in which the UE 730 is currently located. The hardware 735 of the UE 730 further includes processing circuitry 738, which may comprise one or more programmable processors, application-specific integrated circuits, field programmable gate arrays or combinations of these (not shown) adapted to execute instructions. The UE 730 further comprises software 731, which is stored in or accessible by the UE 730 and executable by the processing circuitry 738. The software 731 includes a client application 732. The client application 732 may be operable to provide a service to a human or non-human user via the UE 730, with the support of the host computer 710. In the host computer 710, an executing host application 712 may communicate with the executing client application 732 via the OTT connection 750 terminating at the UE 730 and the host computer 710. In providing the service to the user, the client application 732 may receive request data from the host application 712 and provide user data in response to the request data. The OTT connection 750 may transfer both the request data and the user data. The client application 732 may interact with the user to generate the user data that it provides.

Figure 7:
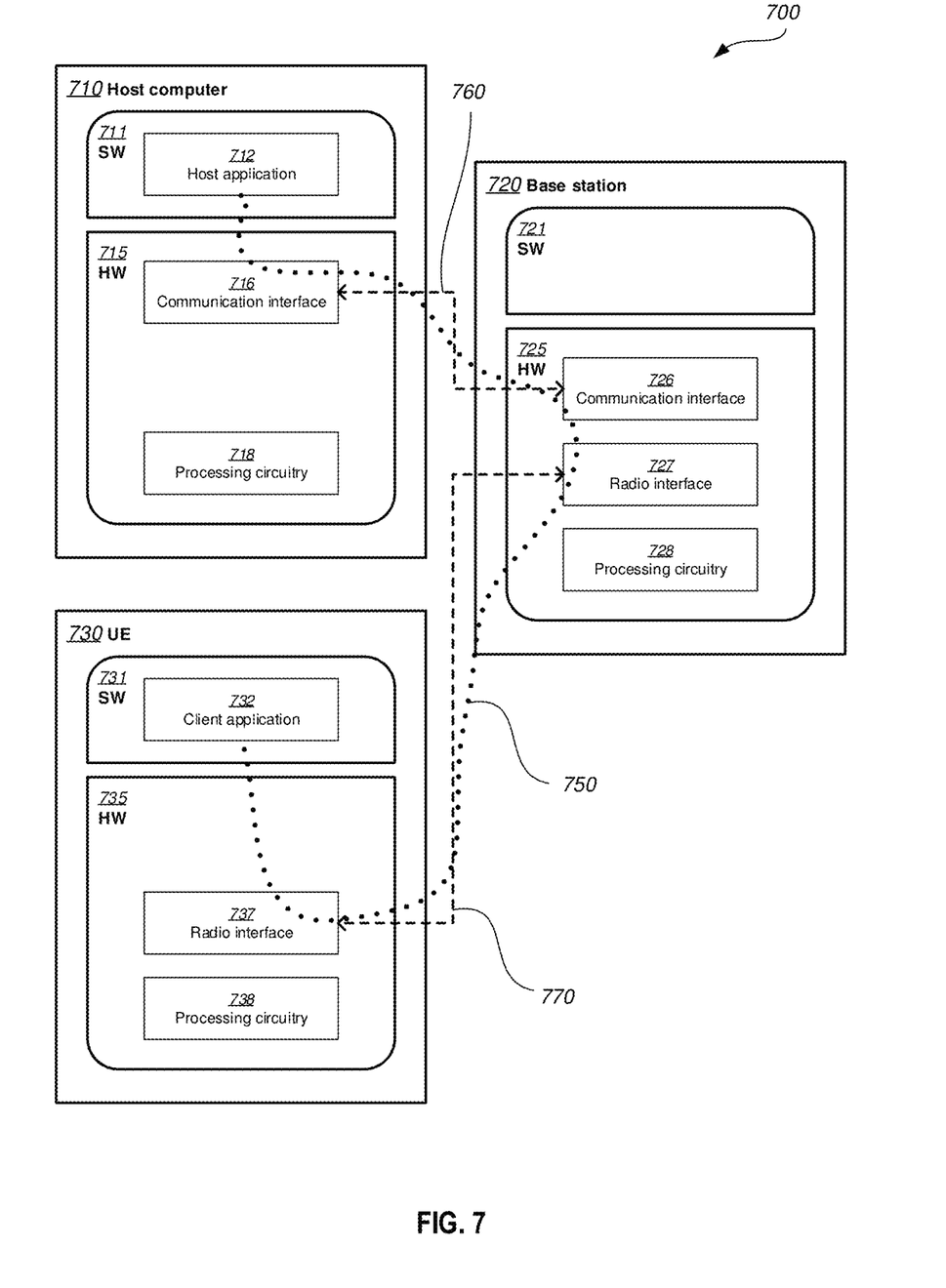
FIG. 7 is a generalized block diagram of a host computer communicating via a base station with a user equipment over a partially wireless connection.

It is noted that the host computer 710, base station 720 and UE 730 illustrated in FIG. 7 may be identical to the host computer 630, one of the base stations 612a, 3212b, 612c and one of the UEs 691, 692 of FIG. 6, respectively. This is to say, the inner workings of these entities may be as shown in FIG. 7 and independently, the surrounding network topology may be that of FIG. 6.

In FIG. 7, the OTT connection 750 has been drawn abstractly to illustrate the communication between the host computer 710 and the use equipment 730 via the base station 720, without explicit reference to any intermediary devices and the precise routing of messages via these devices. Network infrastructure may determine the routing, which it may be configured to hide from the UE 730 or from the service provider operating the host computer 710, or both. While the OTT connection 750 is active, the network infrastructure may further take decisions by which it dynamically changes the routing (e.g., on the basis of load balancing consideration or reconfiguration of the network).

The wireless connection 770 between the UE 730 and the base station 720 is in accordance with the teachings of the embodiments described throughout this disclosure. One or more of the various embodiments improve the performance of OTT services provided to the UE 730 using the OTT connection 750, in which the wireless connection 770 forms the last segment. More precisely, the teachings of these embodiments may improve the efficiency of geo-based transmission and thereby provide benefits such as more accurate geo-based routing, dynamic adjustment of target geographical area, and/or reduced signaling overhead.

A measurement procedure may be provided for the purpose of monitoring data rate, latency and other factors on which the one or more embodiments improve. There may further be an optional network functionality for reconfiguring the OTT connection 750 between the host computer 710 and UE 730, in response to variations in the measurement results. The measurement procedure and/or the network functionality for reconfiguring the OTT connection 750 may be implemented in the software 711 of the host computer 710 or in the software 731 of the UE 730, or both. In embodiments, sensors (not shown) may be deployed in or in association with communication devices through which the OTT connection 750 passes; the sensors may participate in the measurement procedure by supplying values of the monitored quantities exemplified above, or supplying values of other physical quantities from which software 711, 731 may compute or estimate the monitored quantities. The reconfiguring of the OTT connection 750 may include message format, retransmission settings, preferred routing etc.; the reconfiguring need not affect the base station 720, and it may be unknown or imperceptible to the base station 720. Such procedures and functionalities may be known and practiced in the art. In certain embodiments, measurements may involve proprietary UE signaling facilitating the host computer's 710 measurements of throughput, propagation times, latency and the like. The measurements may be implemented in that the software 711, 731 causes messages to be transmitted, in particular empty or 'dummy' messages, using the OTT connection 750 while it monitors propagation times, errors etc.

Figure 8:
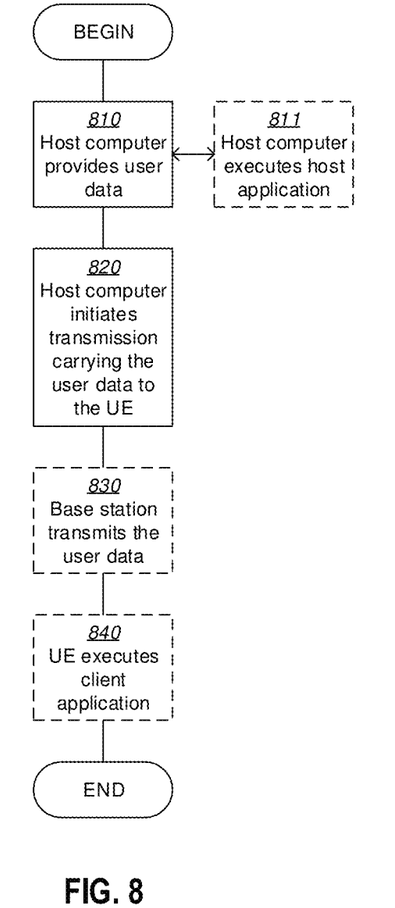
FIG. 8 is a flowchart illustrating a method implemented in a communication system including a host computer, a base station and a user equipment.

FIG. 8 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 8 will be included in this section. In a first step 810 of the method, the host computer provides user data. In an optional substep 811 of the first step 810, the host computer provides the user data by executing a host application. In a second step 820, the host computer initiates a transmission carrying the user data to the UE. In an optional third step 830, the base station transmits to the UE the user data which was carried in the transmission that the host computer initiated, in accordance with the teachings of the embodiments described throughout this disclosure. In an optional fourth step 840, the UE executes a client application associated with the host application executed by the host computer.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a network device for geo-based transmission, the network device comprising at least one Transmission/Reception Point, TRP, each configured with at least one beam, the method comprising:
    obtaining, by the network device, a target geographical area of a data packet for broadcasting the data packet, wherein said obtaining comprises receiving, from a core network node, location information associated with the target geographical area and used to determine the target geographical area for broadcasting the data packet;
    selecting, by the network device, one or more TRPs and/or beams from the at least one TRP and/or the at least one beam for broadcasting the data packet based on the target geographical area by
        determining, by the network device, one or more geographical area units of the network device that cover the target geographical area of the data packet; and
        selecting, by the network device, the one or more TRPs and/or beams associated with the one or more geographical area units from the at least one TRP and/or the at least one beam; and
    broadcasting, by the network device, the data packet over the target geographical area via the one or more TRPs and/or beams selected.

2. The method of claim 1, wherein receiving the location information comprises: receiving, from the core network node, location information indicating the target geographical area.

3. The method of claim 1, wherein the location information comprises location information indicating a source geographical location at which a terminal device transmitting the data packet is located; and wherein obtaining the target geographical area further comprises calculating the target geographical area based at least on the source geographical location.

4. The method of claim 2, wherein the location information is represented by one of: geographical location coordinates, a reference location of a local area, and a local area identifier.

5. The method of claim 2, further comprising receiving the location information on a per packet basis or a per session basis.

6. The method of claim 1, wherein the network device has a coverage area that is divided into a plurality of geographical area units, and said determining comprises:

determining the one or more geographical area units of the network device from the plurality of geographical area units of the network device that cover the target geographical area.

7. The method of claim 1, wherein the data packet is a Multimedia Broadcast/Multicast Service, MBMS, packet transmitted over an MBMS bearer that is mapped to one or more MBMS Radio Bearers, RBs, each corresponding to one of the selected one or more TRPs and/or beams.

8. The method of claim 7, wherein the MBMS packet is associated with Vehicle-to-Everything, V2x, communication.

9. A network device comprising a transceiver, at least one Transmission/Reception Point, TRP, each configured with at least one beam, a processor and a memory, the memory comprising instructions executable by the processor whereby the network device is operative to:

obtain a target geographical area of a data packet for broadcasting the data packet, wherein said obtaining comprises receiving, from a core network node, location information associated with the target geographical area and used to determine the target geographical area for broadcasting the data packet;

select one or more TRPs and/or beams from the at least one TRP and/or the at least one beam for broadcasting the data packet based on the target geographical area by determining one or more geographical area units of the network device that cover the target geographical area of the data packet; and selecting the one or more TRPs and/or beams from TRPs and/or beams associated with the one or more geographical area units from the at least one TRP and/or the at least one beam; and broadcast the data packet over the target geographical area via the one or more TRPs and/or beams selected.

10. A communication system, comprising:
an application server;
a core network node;
a network device comprising at least one Transmission/Reception Point, TRP, each configured with at least one beam that operates to obtain a target geographical area of a data packet for broadcasting the data packet by receiving, from the core network node, location information associated with the target geographical area and used to determine the target geographical area for broadcasting the data packet, select one or more TRPs and/or beams from the at least one TRP and/or the at least one beam for broadcasting the data packet based on the target geographical area by determining one or more geographical area units of the network device that cover the target geographical area of the data packet and selecting the one or more TRPs and/or beams associated with the one or more geographical area units from the at least one TRP and/or the at least one beam, and broadcast the data packet over the target geographical area via the one or more TRPs and/or beams selected;
a transmitting terminal device; and
one or more receiving terminal devices,
wherein the application server is configured to receive a data packet from the transmitting terminal device and forward the data packet, along with location information indicating a target geographical area of the data packet or a source geographical location at which the transmitting terminal device is located, to the core network node,
the core network node is configured to forward the data packet and the location information to the network device,
the network device is configured to broadcast the data packet based on the location information, and
each of the one or more receiving terminal devices is configured to receive the data packet from the network device.

11. The communication system of claim 10, wherein, for each of the one or more receiving terminal devices, the receiving terminal device receives the data packet from a number of TRPs or beams having the highest signal strength or quality, and/or from a number of TRPs or beams each having a signal strength or quality higher than a threshold.

12. The method of claim 1, wherein the network device comprises a base station.

* * * * *